Patented July 8, 1924.

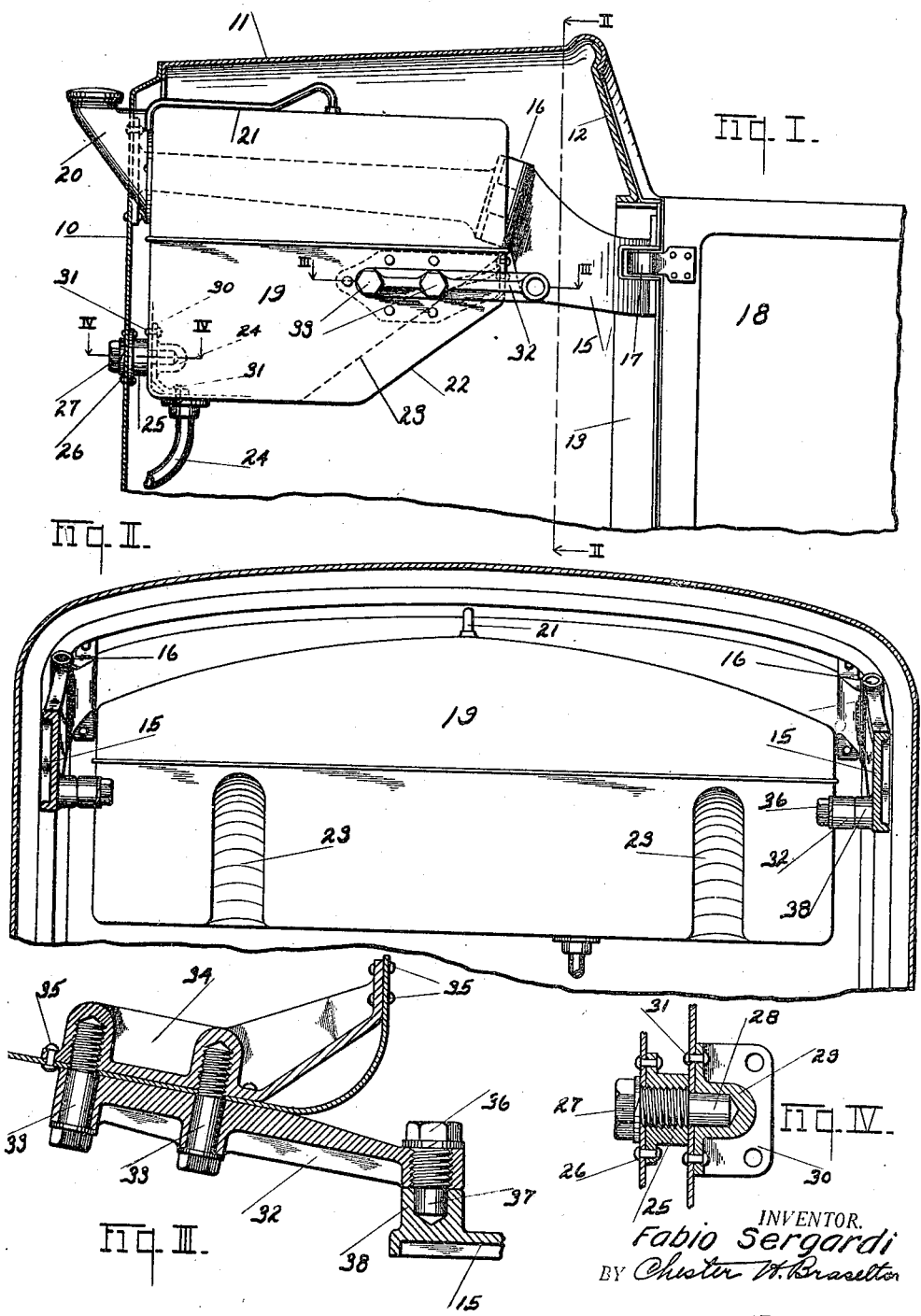

1,500,646

UNITED STATES PATENT OFFICE.

FABIO SERGARDI, OF EAST ORANGE, NEW JERSEY, ASSIGNOR TO WILLYS CORPORATION, OF NEW YORK, N. Y., A CORPORATION OF DELAWARE.

MOTOR VEHICLE.

Application filed December 18, 1920. Serial No. 431,758.

*To all whom it may concern:*

Be it known that I, FABIO SERGARDI, residing at East Orange, county of Essex, State of New Jersey, have invented certain new and useful Improvements in Motor Vehicles, of which I declare the following to be a full, clear, and exact description.

My invention relates to motor vehicles and has for its object to provide improved means for suspending the fuel tank within the cowl of the vehicle.

Another object of the invention is to provide an improved three-point suspension for motor vehicle tanks, two of which may constitute pivotal supports for the tank.

Another object of the invention is to suspend a fuel tank between and upon a pair of frame members connecting the dash and door posts with an independent support for the tank carried by the dash.

Another object of the invention is to provide, within an automobile body, a fuel tank with a three-point suspension, including a front support and independent rear supports connected with the body.

With these and other objects in view, the invention contemplates any and all forms of construction and arrangement of parts which may be found desirable to use and which come within the scope of the invention, it being apparent that various modifications may be employed without departing from the spirit of the invention as expressed in the appended claims.

A structure constituting one embodiment of the invention is illustrated in the accompanying drawing, in which:

Figure I is a longitudinal sectional elevation illustrating the manner of suspending the tank within the cowl of the automobile.

Figure II is a transverse sectional elevation taken on line II—II of Figure I.

Figure III is a horizontal sectional view taken on line III—III of Figure I.

Figure IV is a horizontal section taken on line IV—IV of Figure I.

Like reference characters throughout the several views of the drawing indicate corresponding parts.

The structure illustrated in the drawing comprises a plate or other suitable member extending transversely of the body of the vehicle, such as the dash plate 10 which is adapted to support the front end of the cowl 11 with which it is connected. The instrument board 12 is connected with the cowl and its lower end is carried by suitable upright frame members, such as the side door posts 13 which are connected with the dash or transverse plate 10 by means of the longitudinally extending frame members 15 having sockets 16 for receiving the windshield posts (not shown). Hinges 17 are preferably connected with the rear ends of the frame members 15 to support the side doors 18 as shown in Figure I. Disposed within the cowl and in rear of the dash 10 is a fuel tank 19 having a forwardly and upwardly extending filling nozzle 20, preferably through the dash at the upper side thereof to a point beneath the rear end of the hood (not shown). A vent tube 21 is provided at the top of the tank and extends forwardly thereon with its outer end turned downwardly in front of the tank as indicated in Figure I. The rear end of the tank at the bottom thereof has its lower wall inclined upwardly as indicated at 22, and said wall is provided with the right and left inwardly pressed portions 23 to accommodate the steering column (not shown) either of a right or left hand drive machine. A fuel discharge pipe 24 extends from the front end of the tank and is adapted to convey fuel to the engine.

In suspending the tank I preferably mount it wholly within the cowl and consequently in rear of the dash 10, with one support carried directly by the dash and the other two carried by the frame or brace members 15 which connect the dash with the door posts 13. It will be understood, however, that the term "dash" used hereinafter, includes any suitable transverse plate structure which may be provided for supporting the tank, regardless of its particular location and form of construction.

The front support for the tank, which is centrally located with respect thereto, comprises a threaded member 25 secured on the rear face of the dash by any suitable means, such as the rivets 26, said member being adapted to receive a threaded pin 27 provided with a bearing portion 28 projecting into the recessed portion 29 of a bracket 30 which is preferably disposed within the tank and provided with vertical and horizontal flanges connected with the front and bottom walls of the tank by any suitable means such as the rivets 31. The member 25 engages the front end of the tank to limit the forward movement thereof, and the tank is adapted to be readily slipped on and off of the bearing portion 28 of the pin. The rear portion of the tank is provided with a pair of arms 32 preferably connected with the sides of the tank by means of screws 33 extending through the arms and threaded into the corner brackets 34, which are preferably disposed within the tank and secured to the side and end walls thereof by any suitable means, such as the rivets 35. The rear ends of the arms 32 project from the tank and are threaded to receive the pins 36 which are provided with bearing portions 37 loosely projecting into the boss-like projections 38 on the frame members 15 as shown in Figure III.

In removing the tank from the cowl, it is only necessary to unscrew the pins 36 sufficiently to permit the bearing portions 37 thereof to clear the projections 38 on the frame members 15, at which time the tank may be moved rearwardly far enough to permit the bearing portion 28 of the pin 27 to clear the front end of the tank, after which the tank may be lowered and withdrawn from the cowl. However, if preferred, the pin 27 may also be unscrewed far enough to clear the front end of the tank, but this is not considered necessary.

The three-point suspension above described affords an extremely simple and inexpensive means for supporting the fuel tank within the cowl and permits it to be very quickly and readily assembled within and removed therefrom by requiring only a partial turning of the threaded pins or screws which support the rear end of the tank.

This manner of supporting the tank affords a very flexible suspension, since the bearing portions 37 of the pins 36 are free to rotate within the boss-like projections 38 to permit the tank to pivot upon the frame members 15, whereby strain upon the tank is obviated in case of relative movement between the several parts of the supporting frame structure.

It will be understood that supporting members other than screw threaded pins may be employed for suspending the tank, and that if desired, the brackets 30 and 34 may be placed upon the outside of the tank.

While I have shown and described in considerable detail a specific embodiment of my invention, it is to be understood that this showing and description is illustrative only and for the purpose of rendering the invention more clear, and that I do not regard the invention as limited to the details of construction illustrated or described, nor any of them, except in so far as I have included such limitations within the terms of the following claims, in which it is my intention to claim all novelty inherent in my invention, broadly as well as specifically.

What I claim as new and desire to secure by Letters Patent, is:

1. In a motor vehicle, the combination of a body including a cowl and a dash, a fuel tank within the cowl, a removable pin carried by the dash and adapted to support the front of the tank, arms extending from the rear of the tank, pins projecting through said arms, and means adapted to support said pins.

2. In a motor vehicle, the combination of a body including a dash and a frame, a fuel tank disposed in rear of the dash, a support upon the dash adapted to project into a recessed portion of the tank, arms mounted upon the rear of the tank, and means connecting said arms with said frame.

3. In a motor vehicle, the combination of a body including a dash and a frame, a fuel tank disposed in rear of the dash, arms secured upon the tank, and pins threaded through the arms and having bearing portions rotatably mounted upon said frame.

4. In a motor vehicle, the combination of a body including a dash and a frame provided with recessed portions, a fuel tank, arms secured upon the tank, removable members carried by the arms and projecting into said recessed portions, a recessed member upon the tank, and a supporting member carried by the dash and loosely projecting into said recessed member.

5. In a motor vehicle, the combination of a frame provided with recessed portions, a fuel tank, brackets disposed within said tank, supporting arms upon the tank, screws extending through the arms into threaded engagement with the brackets, and pins threaded in said arms and provided with bearing portions projecting into the recessed portions of said frame.

6. In a motor vehicle, the combination of a frame provided with recessed portions, a fuel tank, brackets disposed within said tank, supporting arms upon the tank, screws extending through the arms into threaded engagement with the brackets, pins threaded is said arms and provided with bearing portions projecting into the recessed portions of said frame, and independent supporting means for the tank.

7. In a motor vehicle, the combination of a body including a dash and a frame provided with recessed portions, a fuel tank, brackets disposed upon said tank, arms upon the tank, screws extending through the arms and threaded into said brackets, pins threaded through said arms and provided with bearing portions projecting into the recessed portions of said frame, a recessed member upon the tank, a member upon the dash extending into engagement with the tank, and a pin threaded through the last mentioned member and provided with a bearing portion projecting into said recessed member.

8. In a motor vehicle, the combination of a dash and upright frame members spaced in rear thereof, longitudinally extending frame members connecting the dash with the first mentioned frame members, a fuel tank disposed between said longitudinally extending frame members, and means connecting the tank therewith.

9. In a motor vehicle, the combination of a dash and upright frame members spaced in rear thereof, longitudinally extending frame members connecting the dash with the first mentioned frame members, a fuel tank disposed between said longitudinally extending frame members, means connecting the tank therewith, and independent means connecting the tank with the dash.

10. In a motor vehicle, the combination of a dash and upright frame members spaced in rear thereof, longitudinally extending frame members connecting the dash with the first mentioned frame members, a fuel tank disposed between said longitudinally extending frame members and provided with a recessed portion, means connecting the tank with said longitudinally extending members, and a supporting member carried by the dash and projecting into the recessed portion of the tank.

11. In a motor vehicle, the combination of a dash and upright frame members spaced in rear thereof, longitudinally extending frame members connecting the upright frame members with the dash, a fuel tank disposed between the last mentioned frame members, arms connected with the tank, removable means connecting the arms with the longitudinally extending frame members, and independent means connecting the tank with the dash.

12. In a motor vehicle, the combination of a dash and upright frame members spaced in rear thereof, longitudinally extending frame members connecting the upright frame members with the dash, a fuel tank disposed between the last mentioned frame members, arms connected with the tank, removable means connecting the arms with the longitudinally extending frame members as a supporting member carried by the dash and projecting into a recess formed in the tank.

13. In a motor vehicle, the combination of a dash and upright frame members spaced in rear thereof, longitudinally extending frame members connecting the upright frame members with the dash, a fuel tank disposed between the last mentioned frame members, arms connected with the tank, removable means connecting the arms with the longitudinally extending frame members, a fixed member secured upon the dash and engaging the front end of the tank, and a removable member extending through said fixed member and having a bearing portion engaging the tank to support the same.

14. In a motor vehicle, the combination of a body including a dash and spaced frame members, a fuel tank disposed in rear of the dash, and a three-point suspension for the tank including a front support carried by the dash and rear pivotal supports carried by said spaced frame members.

15. In a motor vehicle, the combination of a body, a fuel tank and a three-point suspension for the tank including a front central support on the body projecting into a recessed portion of the tank, and rear side supports pivotally connected with the body.

16. In a motor vehicle, the combination of a body, a fuel tank and a three-point suspension for the tank including a front support on the body projecting into a recessed portion of the tank, and a pair of rear side arms including laterally extending removable members pivotally connected with the body.

17. In a motor vehicle, the combination of a body, a fuel tank and a three-point suspension for the tank including two removable pivotal supports at one end of the tank, and a fixed central support at the other end thereof, comprising a socket positioned in said tank, and a removable pin positioned in said body whereby said tank is normally retained from pivotal movement.

18. In a motor vehicle, the combination of a body, a fuel tank and a three-point suspension for the tank upon the body including a fixed support slidably connected with one end of the tank, and two side supports removable transversely of the body.

In testimony whereof, I affix my signature.

FABIO SERGARDI.